United States Patent [19]

Brewer

[11] 4,288,195
[45] Sep. 8, 1981

[54] ROLL-AWAY WHEEL TRUCK AND LIFT TABLE ASSEMBLY

[75] Inventor: John Brewer, Scarborough, Me.

[73] Assignee: Southworth, Incorporated, Portland, Me.

[21] Appl. No.: 103,792

[22] Filed: Dec. 14, 1979

Related U.S. Application Data

[63] Continuation-in-part of Ser. No. 46,521, Jun. 7, 1979, Pat. No. 4,219,186.

[51] Int. Cl.³ .................................................. B60P 1/02
[52] U.S. Cl. .................................. 414/608; 414/498; 187/8.71; 108/143
[58] Field of Search .......................... 187/18, 8.72, 8.71, 187/9 R, 8.77, 95; 414/495, 498, 499, 500, 608, 611; 254/7 C, 8 R, 86, 122, 9, 84, 85; 296/1 R; 104/245, 246, 247, 244, 242; 105/141, 144, 29 R; 108/143; 410/51, 156; 128/73, 70; 269/71

[56] References Cited

U.S. PATENT DOCUMENTS

| Re. 27,914 | 2/1974 | King | 414/495 |
|---|---|---|---|
| 1,415,187 | 5/1922 | Miller | 104/246 |
| 1,813,429 | 7/1931 | Sexton | 254/9 |
| 1,829,358 | 10/1931 | Kintner | 104/247 |
| 2,402,579 | 6/1946 | Ross | 296/1 R |
| 2,489,056 | 11/1949 | Stewart | 254/9 |
| 2,501,001 | 3/1950 | Neely | 254/122 |
| 2,829,863 | 4/1958 | Gibson | 254/8 |
| 2,833,587 | 5/1958 | Saunders | 254/122 |
| 2,920,871 | 1/1960 | Kolodin | 254/133 R |
| 3,111,094 | 11/1963 | Wylie | 104/246 |
| 3,305,117 | 2/1967 | Ford | 414/498 |
| 3,948,403 | 4/1976 | Johansson | 414/495 |
| 4,077,535 | 3/1978 | Orlol | 414/498 |

FOREIGN PATENT DOCUMENTS

| 468832 | 11/1928 | Fed. Rep. of Germany | 254/122 |
|---|---|---|---|
| 619431 | 3/1949 | United Kingdom | 254/8 R |
| 1337853 | 5/1971 | United Kingdom | 414/498 |

*Primary Examiner*—Robert J. Spar
*Assistant Examiner*—Kenneth Noland
*Attorney, Agent, or Firm*—David H. Semmes; Warren E. Olsen

[57] ABSTRACT

A system for allowing a wheeled truck to be rolled on and off a vertically extendable lift table assembly, whereby material handling operations between one vertical elevation, and one horizontal location, and the second vertical location, at a second horizontal location, will be facilitated. The roll-away lifting combination herein essentially comprises a vertically extendable lift table assembly with a cooperating wheeled truck assembly that can be selectively superposed, i.e., moved on or off, a lift table assembly which in turn allows the entire assembly to be conveniently moved from one horizontal location to another. The lift table itself preferably has a double scissor-jack linkwork, which allows the wheeled truck to be raised, for example, to heights of approximately seven feet above a horizontal ground reference. The improved roll-away combination taught herein comprises a particular form of mating between at least one horizontally and longitudinally disposed flange and guideway, on the lift table, and an engaging wheel contact means, on the wheeled truck. The present invention teaches a manner of allowing such a modified wheeled truck to be easily positioned upon said lift table, elevated to any vertical level, or moved to any horizontal location. The truck is temporarily retained upon the table by a frictional resistance against longitudinal roll-away of the truck.

4 Claims, 3 Drawing Figures

ROLL-AWAY WHEEL TRUCK AND LIFT TABLE ASSEMBLY

CROSS-REFERENCE TO RELATED APPLICATIONS

The present application is a continuation-in-part of my co-pending application entitled LIFT TABLE AND COOPERATING WHEEL TRUCK ASSEMBLY, which was filed June 7, 1979 as Ser. No. 46,521 and now U.S. Pat. No. 4,219,186.

BACKGROUND OF THE INVENTION (1) Field of the Invention

A materials handling system comprising a roll-away wheel truck, and a lift table which allows the selective on and off loading of the wheel truck assembly, at any horizontal location. The present invention has particular utility in a loading dock situation, wherein materials have to be on, or off, loaded from a vehicle trailer, at one horizontal location, and one vertical elevation, and thereafter transported to a second horizontal location, and vertical elevation. The present invention constitutes further improvement upon my above-noted copending application, insofar as the present mating of the truck and lift table allows for a frictional engagement which resists, yet does not totally prevent, roll-away of the wheeled truck at any vertical elevation, in addition to a ground elevation.

While lift tables per se are known in the prior art and of course, wheeled push-type trucks are also per se well known in the prior art, the present invention constitutes a functional and structural improvement which greatly enhances the utility of such known types of device. The present invention teaches a synergistic cooperation which results from certain specific modifications of the wheel truck and the lift table, whereby conventional elements have a functional utility together, which neither possessed alone, prior to the modification taught herein.

2. Description of the Prior Art

The prior art, known to applicant, which is pertinent to the present application is adequately discussed in my copending application Ser. No. 46,521.

To summarize the state of that prior art, there are known to be various forms of elevating truck-like devices, although prior teachings have incorporated elevating mechanisms upon wheeled sub-carriages. The present invention, as in the case of my copending application, takes a categorically different approach. Herein, an otherwise conventional wheeled truck is modified so it can be wheeled upon a lifting table which, itself, can also be moved to various horizontal locations. Accordingly, the present invention has a greater degree of flexibility, in that a wheeled truck can be horizontally moved on or off a lift table which can be then placed in any desired horizontal location, and thereafter raised to any desired vertical elevation. It should be manifestly apparent that the present invention departs from prior material handling teachings in that only one lifting platform device need be supplied, in order to serve a plurality of modified wheel truck assemblies, i.e., several mating wheel truck assemblies can be serviced efficiently by one lifting table device, as taught hereinafter. The present invention is also novel in the sense that a lift table assembly can function as a vertical lifting device at a given horizontal location, for a plurality of the modified wheel truck assemblies.

SUMMARY OF THE INVENTION

A roll-away combination which essentially comprises a vertically extendable lift truck assembly and a cooperating wheeled truck assembly that is operable to be selectively rolled on or off a lift table assembly, for material handling purposes. The lift table assembly itself consists of a horizontally extending working platform that is positioned, in the vertical sense, by a scissor jack linkwork assembly. In the preferred embodiment, a double scissor jack linkwork assembly is taught, in order to conveniently allow the lift table to be raised, for example, to heights of approximately seven feet above a ground reference. The double linkwork mechanism, as well as the lift table itself, are per se conventional in the materials handling field. However, the present combination is the result of certain specific modifications which synergistically allow a cooperative function for a combination; which either a wheeled truck assembly, or a lift table, alone, does not contemplate. The preferred embodiment requires modification of a lift table working platform with the addition of at least one horizontally extending and longitudinally disposed flange which cooperates with at least one horizontally extending guideway for maintaining a superposed wheeled truck in a frictional engagement during any lift table movement.

The second essential part of the combination, as taught hereafter, is a wheeled truck assembly which is conventional, except for certain specifically taught modifications. The wheels maintain a load platform at a particular first distance above a ground reference, and this first distance allows the truck to be horizontally wheeled, in a longitudinal direction, so that certain structure on the underside of the truck load platform interacts with certain lift table load platform structure. The truck assembly can be wheeled, for example, onto a horizontally extending flange which extends, in a longitudinal direction, from the working platform surface of the lift table. The wheeled truck further includes an inwardly open, channel-like structure which longitudinally extends, and will vertically surround a horizontally extending guideway that is spaced above the flange of the lift table. Accordingly, when the thusly modified wheel truck assembly is operably positioned upon that flange, the truck will be maintained against any transverse movement by a cooperation between the guideway and engaging means on the wheeled truck. Furthermore, the guideway is so configured that there will be a relatively slight frictional engagement between the horizontally extending guideway of the lift table, and at least one surface of an inwardly open channel which may define the wheeled truck engaging means. In this fashion, a wheeled truck will be maintained, frictionally, as the lift table is either used to vertically raise the assembly, or used to move the assembly to a second horizontal location.

It is a primary object of the present invention to teach certain additional improvements upon the system taught in my copending application Ser. No. 46,521, and to particularly also allow a modified wheeled truck to be on or off loaded at any vertical elevation desired. It is a significant object of the invention to teach a system which essentially requires only one relatively expensive lift table assembly to serve a plurality of wheel trucks which need be raised and moved in vertical and horizontal directions. It is a related object of the present invention to teach a manner of modifying certain relatively conventional material handling equipment, so as to allow a novel and synergistic cooperation of two structures, into a singularly effective lifting combination.

Other features, advantages and objects of the present invention will become more apparent from the detailed description which follows, wherein reference is made to the accompanying drawings.

DESCRIPTION OF THE PREFERRED EMBODIMENT

Figure 1:
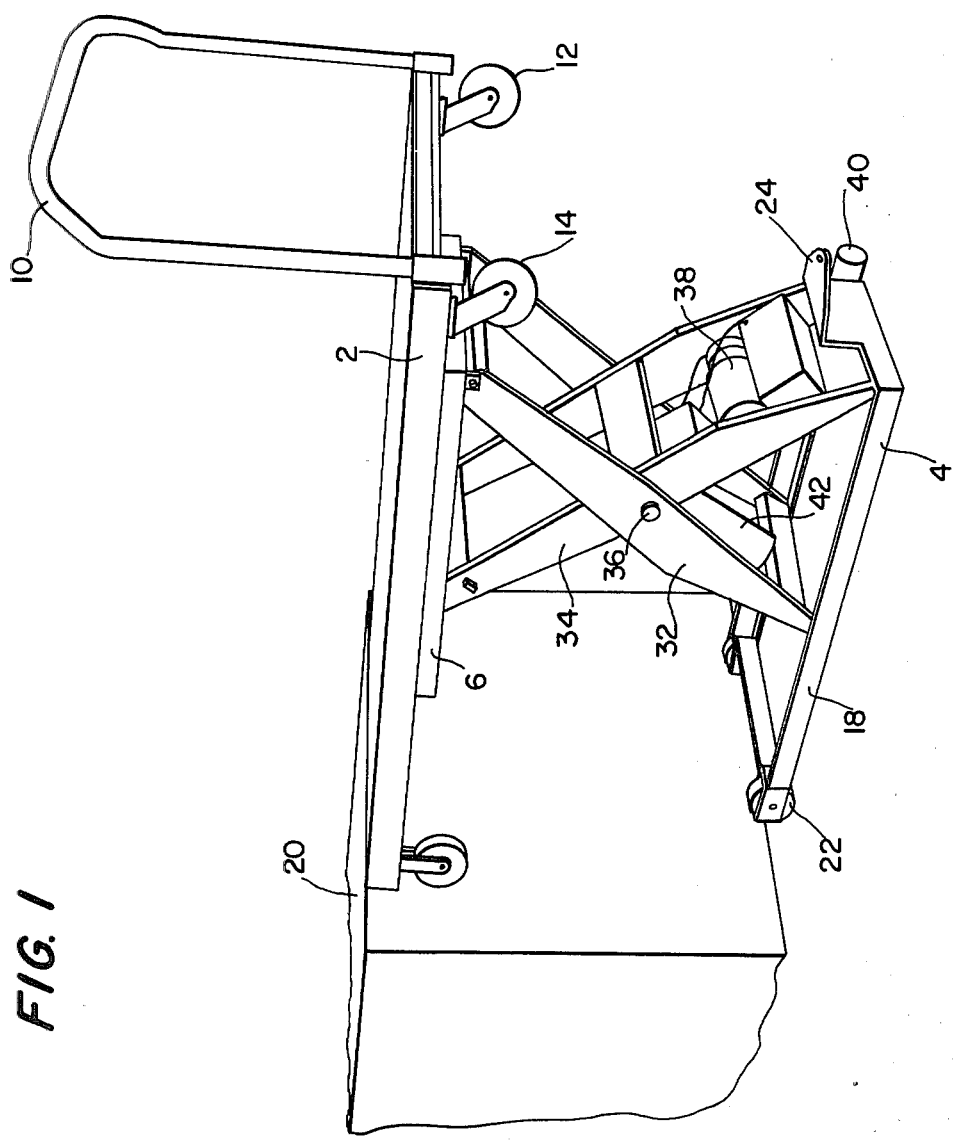
FIG. 1 is a perspective elevation view showing a lift table, and cooperating wheel truck, according to the teachings in my copending application, of which the present invention is a continuation-in-part.

A novel lift table, and cooperating wheel truck assembly, according to the teachings of my parent application is repeated herein at FIG. 1. A wheel truck, 2, with handle 10, is in a superposed mating relation upon a lift table assembly, 4. The wheel truck 2 is shown directly resting upon a working platform, 6; there is an engagement between the under-surface of the truck and the top of the lift table, with wheels, 14, 16, freely suspended.

The FIG. 1 combination is more particularly taught in parent application Ser. No. 46,521, and for that purpose is incorporated by reference, herein. By way of summary, FIG. 1 shows a single linkwork assembly, wherein a single hydraulic cylinder, 42, urges upward a first link, 34. A second link, 32, pivots about a pin connection, 36, with first link, 34. Fluid for this scissor jack actuation is supplied through a conventional pumping circuit to the hydraulic cylinder, 42, as shown generally at 38, with power input being, for example, through an electric receptacle, 40. The lift table assembly further comprises a subcarriage support, 18, which may be independently moved in any horizontal manner, for placement on any ground reference point. As shown in FIG. 1, this earlier teaching includes placement of the table 4, and then a superposed mating engagement of a wheeled truck at a ground level. Hence, as in FIG. 1, materials can be moved from a building platform, 20, directly upon a raised wheeled truck which, then is lowered and removed from the lift table assembly. The lift table assembly can be horizontally moved by engaging a dolly device under the yoke, 24, thereby trailing the entire device by a horizontal bearing upon the wheels, 22. Having now reviewed the operation of the device shown in FIG. 1, and more particularly described in my copending parent application, I will now describe more particularly the present improvements as they relate to a roll-away lifting combination.

Figure 2:
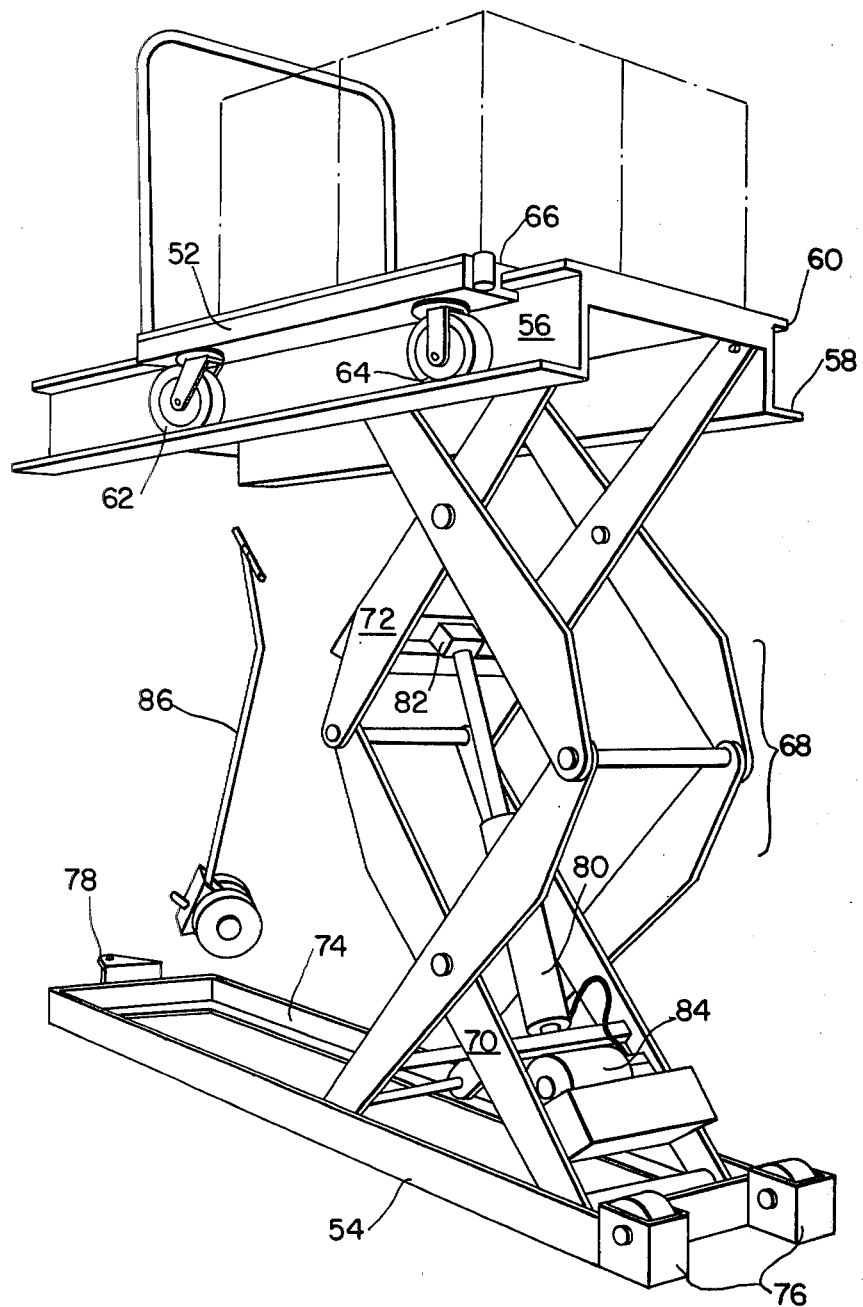
FIG. 2 is a perspective elevation view showing a roll-away lifting combination according to the teachings of the present invention.

FIG. 2 is a preferred embodiment for the roll-away lift table and wheel truck assembly which is taught herein, and in certain respects there is a similarity of the presently taught invention and the earlier teachings which are summarized herein at FIG. 1.

The present invention departs from the lift table and cooperating wheel truck assembly of the parent application in that the present invention allows a uniquely modified wheeled truck to be on or off loaded from the lift table at any desired elevation. The lift table assembly comprises a working platform, 56, which is operable to be vertically extended by a scissor jack linkwork assembly, illustrated generally at 68. A double jack linkwork assembly is preferred, to greatly raise the work platform, 56, with respect to a lift table sub-carriage, identified generally at 54 in FIG. 2.

The superposed truck assembly, 52, essentially comprises a load platform, 66, which is normally supported by conventional pivotable wheels, 62, 64. Hence, the underside of load platform, 66, is maintained at a first distance above any ground reference, and this distance may be chosen to allow a certain frictional contact between the wheeled truck and some structure of the lift table work surface, 56. The working platform further comprises at least one horizontally extending, and longitudinally disposed flange, 58, and at least one horizontally extending guideway, 60. When the wheel truck is selectively positioned as shown in FIG. 2, the guideway, 60, and the flange, 58, may preferably define an outwardly open channel, with the guideway selectively engaging an inwardly-open channel member of the wheel truck, as shown. This inwardly open channel is spaced sufficiently above a ground contact level, by the wheels 62, 64, to allow the truck assembly to be horizontally wheeled onto the flange, whereby the inwardly facing engaging means on the wheel truck will vertically surround the horizontally extending guideway, 60, on the lift table. In the illustrated, preferred embodiment there is a frictional contact between at least one surface of the inwardly open truck guide means, 66, and the horizontal lift table guideway, 60. This engagement resists any possibility that the wheeled truck, 52, will move while positioned upon the lift table assembly, during lift table movement.

As further shown in FIG. 2, the subcarriage, 54, of the lifting table assembly can be moved horizontally by raising a yoke, 78, through a dolly service, 86, wherein the subcarriage wheels, 76, will then enable horizontal movements of the entire assembly. The preferred embodiment illustrates a double scissor jack assembly, shown generally at 68. The first linkwork has a first link, 70, which is pivotally attached to one link, 72, of a second linkwork. A hydraulic cylinder, 80, urges up the assembly by a contact with the link, 72, as by the pivot, 82. The first linkwork assembly also includes a second pair of links which have lower ends which travel horizontally upon guideways, 74, located as shown within the subcarriage, 54. As previously noted, a double scissor linkwork as taught herein is per se conventional, and further illustration of this aspect of the present combination is not considered necessary.

Figure 3:
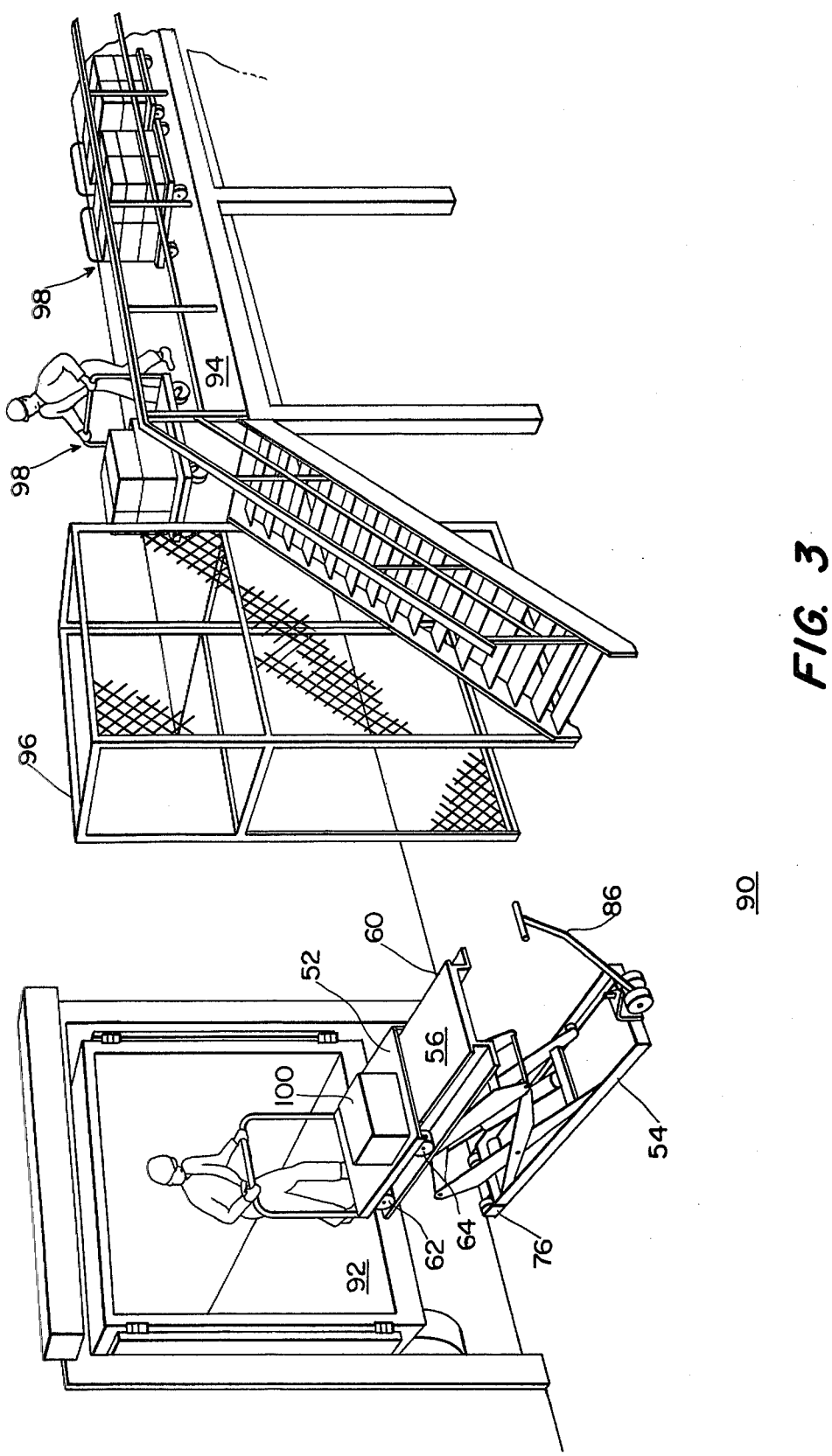
FIG. 3 is a perspective elevation view showing use of a roll-away lifting mechanism, according to the present invention, in a material handling environment.

FIG. 3 shows an environmental application of the combination taught according to the present invention. The material handling problem illustrated in FIG. 3 is the off or on loading of a truck bed, 92, which is maintained at a given vertical elevation. The operation is shown pushing a wheel truck, 52, (modified as taught herein) from the vertical elevation, 92, onto the horizontal flange, 58, and into engagement with the guideway, 60, of the working platform, 56. Such a longitudinal movement of the wheeled truck is ensured by the cooperation of the wheels and the engaging means on the bottom or underside of the wheeled truck. The lift table sub-carriage, 54, is supported upon a ground reference, 90, and may then be moved from that position by conventional use of dolly, 86, which raises the entire assembly backwardly and upon the sub-carriage wheels, 76. The entire assembly can be moved into any location, for example where the exemplary goods, 100, need to be handled. For example, and as illustrated in FIG. 3, there may be a protectively enclosed space, 96, which will allow the present invention to be used as a portable elevator device, for raising the load, 100, up to a second vertical elevation, 94. The operation contemplates use of a plurality of additional modified wheel truck assemblies, 98, with a single lifting table working surface, 56.

Manifestly, the present invention expands the utility of the known wheeled truck, by the novel concept of employing a plurality of specifically improved wheeled trucks to mate in a particular way, with the upper surface of a conventional lift table. The present invention is a roll-away lifting combination, which greatly facilitates material handling in a warehouse type environment, since a number of modified wheeled platform trucks can be used to mate, in a roll-away fashion, with a single lifting platform. The present invention does not require a lifting mechanism for each truck, nor does the present invention require any involved mechanical interactions for initially placing a wheeled vehicle into place on the lifting table working platform.

Since certain adaptations and modifications of the present invention will be apparent to those of ordinary skill in this art, it is to be understood that the invention is to be limited solely by the scope of the appended claims.

I claim:

1. A roll-away lifting combination which essentially comprises a vertically extendable lift table assembly and a cooperating wheeled truck assembly that is operable for a selective, roll-away superposed mating upon said lift table assembly; wherein,
    (a) said lift table assembly comprises a horizontally extending working platform which is positioned above, and operable to be vertically extended by, a scissor jack linkwork assembly, said working platform further comprising at least one horizontally extending and longitudinally disposed flange and at least one horizontally extending guideway which is also horizontally disposed and spaced above said flange; wherein,
    (b) said wheeled truck assembly comprises a load platform supported upon wheels which maintain the load platform underside at a first distance above a ground reference, said first distance being sufficient to allow said truck assembly to be horizontally wheeled from a ground reference onto said horizontally extending flange of said working platform when said lift table assembly is in a lowered position upon said ground reference, said wheeled truck assembly further including means to vertically surround and frictionally engage said horizontally extending guideway of said lift table assembly when so wheeled thereover, whereby said wheels are operable to be selectively positioned upon said flange while maintained against any transverse movement, and retarded against any longitudinal movement, by said guideway, wherein said truck assembly is operable to be raised to any desired vertical elevation above said ground reference, and then selectively wheeled off, in said longitudinal direction.

2. A roll-away lifting combination according to claim 1, wherein said horizontally extending guideway further comprises a longitudinally extending flange on either side of said working platform, and said vertically surrounding engaging means on said wheeled truck comprises a longitudinally disposed, and inwardly open channel which extends downwardly from either side of said load platform towards said wheels, wherein each longitudinally disposed horizontally extending flange and guideway further comprises an outwardly open channel for frictionally engaging said wheeled truck engaging means while supporting said wheels, to provide a resistance against longitudinal roll-away of said truck.

3. A roll-away lifting combination according to either claim 1 or 2, wherein said lift table assembly further comprises a sub-carriage support for said scissor jack linkwork assembly, said sub-carriage including means to allow independent horizontal movement and placement of said lift table upon said ground reference, while said lift table is at any desired vertical elevation, to thereby allow a wheeled truck to be on or off-loaded at any desired vertical elevation and horizontal location.

4. A roll-away lifting combination according to claim 3 wherein said scissor jack linkwork assembly is a double linkage, and includes a self-contained hydraulic actuating circuit and drive means for urging one link of a first linkwork assembly in a pivoting relationship, wherein said one link has a first end which rotatably engages a fixed point on a sub-carriage support and an opposite end which pivotally engages one link to a second linkwork assembly that engages a longitudinally extending guide on the underside of said working platform.

* * * * *